May 11, 1926.
L. BERTELE
PHOTOGRAPHIC LENS
Filed Jan. 13, 1923
1,584,271
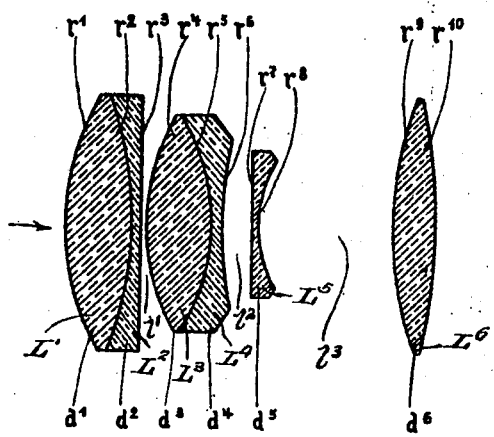
Focal length=100, diameter=50.0
$r_1 = +47.98$   $d_1 = 13.33$
$r_2 = -70.37$   $d_2 = 1.67$
$r_3 = \pm \infty$   $l_1 = .50$
$r_4 = +40.82$   $d_3 = 11.33$
$r_5 = -33.33$   $d_4 = 1.50$
$r_6 = +75.28$   $l_2 = 6.15$
$r_7 = -193.62$   $d_5 = 1.00$
$r_8 = +23.95$   $l_3 = 28.25$
$r_9 = +68.78$   $d_6 = 8.33$
$r_{10} = -90.75$
|  | $N_D$ | $N_G$ |
|---|---|---|
| $L_1 = 1.6102$ | | 1.6234 |
| $L_2 = L_5 = 1.6728$ | | 1.7009 |
| $L_3 = 1.6043$ | | 1.6189 |
| $L_4 = 1.5933$ | | 1.6075 |
| $L_6 = 1.6225$ | | 1.6376 |
Chromatic dispersion of $L_1$ less than that of $L_2$.
   "        "        "   $L_4$  "   "   "   "  $L_3$.
Witnesses:
Inventor:
Ludwig Bertele.
By William C. Linton
Atty.

Patented May 11, 1926.

1,584,271

UNITED STATES PATENT OFFICE.

LUDWIG BERTELE, OF DRESDEN, GERMANY.

PHOTOGRAPHIC LENS.

Application filed January 13, 1923. Serial No. 612,563.

The present invention relates in particular to improvements in lenses employed in cinematographic cameras and projectors and such an improved lens is superior to ordinary lenses with an astigmatic planing of the view field in permitting a very large proportion of aperture without any loss of definition; the reason for this condition is that spherical aberration for any color and any height of incidence has been absolutely removed while curvature of the view field has been completely avoided. This advantage is attained by abandoning the diverging or slightly converging course of rays behind the central member, as heretofore used in connection with all known lenses with diffusing central member consisting of one or more lenses, in favor of a considerably converging course of rays.

One way to reach this goal is to choose a strongly refractive converging front member. As inevitably, under very large proportions of aperture, considerable curvatures result therefrom, practical reasons forbid constructing the collective front member as a single lens and it has, therefore, been divided into two collective systems separated by an air-filled space. The course of the coma correction demands the meniscus form for at least the second collective system in the convergent front member. With the lens arrangement described above the correction of the spherical aberration, astigmatism, curvature of the view field, the sine condition, the coma and distortion can be carried through. The possibility of a perfect achromatism as required by an aperture of that size appears to be excluded.

The balance of the orthochromatic aberration which is especially troublesome after complete removal of the curvature of the view field can be simultaneously abolished with achromatism of the intersectional widths of periaxial rays by inserting a cemented doublet into one of the collective lenses of the first member. This doublet is formed by a positive and a negative lens in which the power of chromatic dispersion of the negative lens must be considerably higher than that of the positive lens. The combination of the two lenses will then act in the sense of chromatic super-correction.

There appear furthermore very great errors in the chromatic variation of the spherical aberration in the sense of super-correction. The large aperture demands a removal of this error and the said removal is accomplished by introducing another cemented doublet into the other collective lens. This doublet consists also of a positive lens and a negative lens, but in contradistinction to the other doublet, the positive lens must possess a higher chromatic power of dispersion than the negative lens. The combination formed by cementing these two lenses together will then act in the sense of chromatic under-correction. The position and form of the cemented surface of said doublet must be such that the angles formed by the axially parallel border rays with the radius of curvature of the surface are very large.

It has been found advantageous to attach this cemented surface, acting in the sense of chromatic under-correction, to the second meniscus-shaped collective lens of the converging front member. It has furthermore been noticed that a completely satisfying chromatic compensation is maintained, if the first collective lens of the converging front member is composed of a collective crown glass lens of low diffusion and a diverging lens of heavy flint glass so that the difference of the value becomes as great as possible, and if simultaneously the second meniscus-like collective lens is composed of crown and flint glass whose difference in values amounts at the highest to $2/3$ of the corresponding difference for the two lenses of the first part of the converging front member. If the glass is distributed in this manner, the desired chromatic correction will be uniformly attained with cemented surfaces which are either convex or concave towards the diaphragm; in the interest of practical manufacture it is however advisable to choose cementing surfaces which are convex towards the diaphragm whereby too small radii will be avoided.

In the drawings, I have illustrated a sectional view of a lens embodying the present invention.

According to the preceding considerations, the lens is of the following shape: It consists of three members of which the first one turned towards the entering light, is a collective member consisting of two systems. Each system comprises two pieces forming a doublet which may be cemented together. In the drawing the members of the first doublet are designated $L_1$ and $L_2$, and the members of the second doublet are designated $L_3$ and $L_4$. These two doublets form the front collective member. The second member is a dispersing one (a single concave lens of flint glass). The third member is a collective one (a single convex lens of heavy Baryt crown glass), which is placed at a relatively great distance from the second member. In the first positive system of the front member, the lens $L_1$ is positive and has a low chromatic dispersion being preferably made of crown glass, while the lens $L_2$ which is cemented to $L_1$ is negative and has a higher chromatic dispersion being preferably made of flint glass. The doublet $L_1$ and $L_2$ acts, therefore, in the sense of chromatic super-correction.

In the second system of the front member, the lens $L_3$ is positive and has a higher chromatic dispersion than the lens $L_4$ which is negative. This doublet, therefore, acts in the sense of chromatic under-correction.

It will be seen that the doublets which form the front collective member of the lens are chromatically antagonistic, the first producing a chromatic super-correction, and the second producing a chromatic under-correction.

The second collective system, the doublet $L_3$ and $L_4$, is given the form of a meniscus in order to attain a better correction of the coma condition and curvature of the view field.

In the drawing, $d_1$, $d_2$, $d_3$, $d_4$, $d_5$ and $d_6$ are designations for the thicknesses of the lenses $L^1$, $L^2$, $L^3$, $L^4$, $L^5$ and $L^6$ respectively; $r_1$, $r_2$, $r_3$, $r_4$, $r_5$, $r_6$, $r_7$, $r_8$, $r_9$ and $r_{10}$ are designations for the radii of curvature of the surfaces of the various lenses; and $l_1$, $l_2$ and $l_3$ refer to the thickness of the air spaces between the various members.

The lens illustrated in the accompanying drawing has been chromatically, spherically, for any color, and in regard to sinical conditions, astigmatism and distortion corrected for a proportion of aperture f:2 whereby simultaneously anastigmatical planing of the view field has been attained. The following calculation is the mathmetical expression of this condition:

$r_1 = + 47.98$  $d_1 = 13.33$
$r_2 = - 70.37$  $d_2 = 1.67$
$r_3 = \pm \infty$  $l_1 = .50$
$r_4 = + 40.82$  $d_3 = 13.33$
$r_5 = - 38.33$  $d_4 = 1.50$
$r_6 = + 75.28$  $l_2 = 6.15$
$r_7 = -199.62$  $d_5 = 1.00$
$r_8 = + 23.95$  $l_3 = 28.25$
$r_9 = + 68.78$  $d_6 = 8.33$
$r_{10} = - 90.75$ Focal length=100; diameter=50.0

|  | $n_D$ | $n_G'$ |
|---|---|---|
| $L_1=$ | 1.6102 | 1.6234 |
| $L_2=L_5=$ | 1.6728 | 1.7009 |
| $L_3=$ | 1.6043 | 1.6199 |
| $L_4=$ | 1.5933 | 1.6075 |
| $L_6=$ | 1.6225 | 1.6376 |

Chromatic dispersion of $L_1$ less than that of $L_2$.

Chromatic dispersion of $L_4$ less than that of $L_3$.

Having now described my invention and how the same is to be performed what I claim and desire to secure by Letters Patent is:—

1. A lens with removed curvature of the view field comprising a dispersing member, a collective member on each side of said dispersing member and separated therefrom by interjacent spaces, one of the said collective members comprising two collective systems, said two collective systems being chromatically antagonistic.

2. A lens with removed curvature of the view field comprising a dispersing member, a collective member on each side of said dispersing member and separated therefrom by interjacent spaces, one of the said collective members comprising two collective systems, said two collective systems being chromatically antagonistic, and each composed of a doublet.

3. In a lens, according to claim 3, an arrangement such that one system of a collective member comprises a converging lens of crown glass with low chromatic dispersion and of a dispersing lens of heavy flint glass.

4. In a lens, according to claim 3, an arrangement such that one system of a collective member comprises a converging lens with medium dispersion and a dispersing lens with low dispersion.

5. In a lens, according to claim 3, an arrangement such that the rays falling about the axis of said dispersing member, converge strongly after their emersion from said dispersing member.

6. A lens comprising three members: the first member being strongly convergent and comprising two chromatically antagonistic systems, each system comprising a doublet of crown glass and flint glass, the second member consisting of a single concave lens of flint glass; and the third member consisting of a single convex lens of heavy crown glass.

7. A lens comprising three members: the first member being strongly convergent and comprising two chromatically antagonistic systems, each system comprising a doublet; the second member comprising a concave lens, and the third member comprising a convex lens.

8. A lens, according to claim 7, wherein one of said doublets acts in the sense of chromatic super-correction, and the other of said doublets acts in the direction of chromatic under-correction.

9. A lense, according to claim 7, wherein one of said doublets is positive, and composed of a positive lens of low chromatic dispersion, and a negative lens of higher chromatic dispersion, the effect of the combination being one of chromatic super-correction; and the other of said doublets is composed of a positive and a negative lens, the positive lens having a higher chromatic dispersion than the negative lens, the effect of the latter combination being one of chromatic under-correction.

10. A lens comprising three members, the first member comprising a system having superchromatic correction, and another system having chromatic under-correction, the second and third members being respectively diverging and converging members.

11. A lens comprising a dispersing member and three collective members, two of said collective members being positioned before and one of said collective members being positioned behind the dispersing member, one of the first two collective members being a doublet, the positive lens of which consists of a glass with materially lower chromatic dispersions than the negative lens, and the other one of the first two collective front members being a doublet, the positive lens of which shows a higher chromatic dispersion than the negative lens.

12. A lens comprising six members as follows: a positive member of low chromatic dispersion, a negative member of higher chromatic dispersion than said positive member, a second positive member of medium dispersion, a second negative member of lower chromatic dispersion than said second positive member, a dispersing member, and a third positive member.

13. A lens, according to claim 12, wherein the first positive member and the first negative member form a doublet, said doublet being chromatically antagonistic to a similar doublet formed by the second positive member and the second negative member.

In testimony whereof I affix my signature.

LUDWIG BERTELE.